(12) United States Patent
Hargrove et al.

(10) Patent No.: US 7,867,432 B2
(45) Date of Patent: Jan. 11, 2011

(54) LOAD BEARING INSULATION AND METHOD OF MANUFACTURE AND USE

(76) Inventors: Joshua Wade Hargrove, P.O. Box 1420, Mason, TX (US) 76856; Zachary Kent Rabon, P.O. Box 1420, Mason, TX (US) 76856

( * ) Notice: Subject to any disclaimer, the term of this patent is extended or adjusted under 35 U.S.C. 154(b) by 138 days.

(21) Appl. No.: 11/851,041

(22) Filed: Sep. 6, 2007

(65) Prior Publication Data

US 2009/0065978 A1    Mar. 12, 2009

(51) Int. Cl.
  *B28B 5/00*    (2006.01)
  *C04B 18/18*   (2006.01)
(52) U.S. Cl. .................... 264/426; 264/297.9
(58) Field of Classification Search .............. 264/426, 264/297.9
  See application file for complete search history.

(56) References Cited

U.S. PATENT DOCUMENTS

| | | | |
|---|---|---|---|
| 3,403,205 A | 9/1968 | Ottenholm | |
| 3,922,413 A | 11/1975 | Reineman | |
| 5,350,451 A | 9/1994 | Patterson | |
| 5,534,058 A | 7/1996 | Strabala | |
| 5,538,553 A | 7/1996 | Burgand | |
| 5,641,584 A | 6/1997 | Andersen et al. | |
| 5,849,155 A | 12/1998 | Gasland | |
| 6,200,379 B1 | 3/2001 | Strabala | |
| 6,299,726 B1 | 10/2001 | Andersen et al. | |
| 6,676,744 B2 * | 1/2004 | Merkley et al. | 106/674 |
| 6,809,131 B2 | 10/2004 | Li et al. | |
| 6,862,847 B2 | 3/2005 | Bigelow | |
| 6,942,726 B2 | 9/2005 | Cook et al. | |

OTHER PUBLICATIONS

Fuller, Barry J., Apostolos Fafitis, and Jorge L. Santamaria, "The Paper Alternative" Civil Engineer May 2006, pp. 72-77.

* cited by examiner

*Primary Examiner*—Thao T. Tran
(74) *Attorney, Agent, or Firm*—David B. Dickinson

(57) ABSTRACT

A building material which comprises cement, cellulose fibers and admixtures is used in the fabrication of bricks, panels or other building products. The manufacture of this building material is accomplished by adding water, paper, a water repellant composed of calcium stearate, and a sodium silicate to act as a fire retardant material. The mixture is then thickened with cement and a second batch of concrete admixtures including a superplasticizer composed of a polyester polyacrylic polyol and an air entraining resin or surfactant to create an air entrained, viscous material for inserting in a mold or extruding through a press to form load bearing and insulating building materials. The resulting product can be formed into blocks or panels and the panels can be coated with polyurethane/polyurea coating to be bullet and blast resistant.

15 Claims, 1 Drawing Sheet

LOAD BEARING INSULATION AND METHOD OF MANUFACTURE AND USE

BACKGROUND OF THE INVENTION

1. Field of the Invention

The present invention relates generally to an insulating building material and method of manufacture of the same and the use of the same in construction; more specifically, to a cellulosic cementitious material providing both compressive strength and insulation and a method for mixing the cellulose and cementitious materials to form a paste which upon curing is both compressively strong and highly insulating.

2. Related Art

The building trades have long sought a building material that combined compressive strength with high insulating qualities. Various concrete mixtures have been made with various porous aggregates and by incorporation of a cement paste into a cellular matrix of air voids to create an insulating concrete, but these have suffered from having a 28-day compressive strength from only 100 to 1000 psi (0.69 to 6.9 MPa). The environmental movement has increased the demand for reuse of the substantial amount of paper generated each year. Paper recycling bins positioned in school and church parking lots to encourage the reuse of scrap paper is a testament to the public demand for ecologically sensitive paper recycling.

The use of a combination of recycled paper and Portland cement, called papercrete, has increased public attention and lead to substantial experimentation of this form of building material. For example, U.S. Pat. No. 5,350,451 to Patterson teaches mixing water and paper products in a high speed shearing blender to form a comminuted slurry then mixing in cement in a ratio of four to one. Patterson comminutes the paper feedstock by running through a cutter running at around 3000 rpm or higher. This wet comminuted paper is then coated with the cement and the mixture is dumped on a screen to allow water to drain off. Patterson suggests, when making blocks from the slurry, to allow the water to drain off for sixty to ninety minutes and the concrete to begin to set before placing the mixture in the molds. Not only is the output from this process limited, the time to mix economically useable building products is generally too slow for commercial use.

Other patents discuss the use of cellulose to reinforce concrete mixes; see, for example, U.S. Pat. No. 6,942,726 to Cook et al. Various methods have been offered for dispersing cellulose fibers in water for use. See for example U.S. Pat. No. 5,849,155 to Gasland. Other patents have suggested the addition of insulation materials to cement blends to form highly insulating cementitious matrices and have provided teaching as to the method of manufacture of these products. See U.S. Pat. No. 5,641,584 to Andersen et al.

SUMMARY OF THE INVENTION

An insulating building material prepared by a process comprising the steps of mixing shredded cellulose fibers with water, together with sodium silicate, to form a first matrix; adding cementitious material and a water dispersing super plasticizing admixture to the first matrix; adding a viscosity modifier, water reducing admixture to the cementitious containing first matrix forming a thickened second matrix; adding additional water to the thickened second matrix; forming a building product from such thickened second matrix; and, allowing said building product to cure.

The insulating building material can be formed by placing the thickened second matrix in a drying mold to form an insulating building material or extruding the thickened second matrix and cutting the extruded material into blocks. The water dispersing superplasticizing admixture can be water, a polyester polyacrylic polyol, calcium stearate, triethanolomine and 4-cloro-3-methylphenol and sodium silicate and the viscosity modifier admixture is water, triethanolomine, dodecylbenzenesulfonate, naphthalene sulfonate, welan gum, and 4-cloro-3-methylphenol. The cementitious material can be a hydraulic cement selected from a group consisting of Portland cement, cement and fly ash, lime, casein, gypsum, slag cement, calcium aluminate cement, phosphate cement, high alumina cement, or metakaolin, or some combination of these materials or alternatively, the cementitious material can be a combination of Portland cement and Type C fly ash.

The Portland cement can be about 80% by weight and the fly ash is Type C and about 20% by weight of the cementitious material. The cellulose fibers can preferably be short fiber shredded paper providing a combination of mixed size particles wherein the largest short fiber shredded paper particles is smaller than $\frac{1}{4}$ inch$^2$.

As an alternative use of this material, the insulating building material can be coated with a polyurethane/polyurea elastomeric material to form a blast and bullet resistant building material.

The present invention can provide a method for fabricating insulating building material comprising the steps of combining water, sodium silicate, and shredded paper in a mixer for a period of time sufficient to allow thorough wetting of the shredded paper with the water and sodium silicate mixture, which is typically no less than twenty minutes; introducing cement and a water-reducing superplasticizer into the mixer and accelerating the mixing; introducing additional water together with an air entraining resin or surfactant and a viscosity modifier; and, pouring the mixture into one or more drying molds. This method can further provide for the steps of allowing initial water runoff from the filled curing molds; striking off excess material in the filled curing molds; permitting initial hardening to occur; and, removing the curing insulating building material from the molds. These steps should take no longer than seventy-five minutes and produce a curing molded building block capable of being palletized in twelve hours from the start of the process. This method also can provide for the recovery of water runoff for the incremental reuse in mixing of the insulating building material to provide an ecologically sound fabrication method.

The curing of the molded blocks formed from this insulating building material can be accomplished in a wet-heated curing chamber to accelerate the drying process, thereby speeding up the curing and palletizing step previously described.

The shredded paper recycled is a short fiber paper derived from a group consisting of newsprint, phone books, waste office paper and lottery tickets. This ecologically sensitive method of creating new building materials permits further use of trees without further deforestation, while still providing well insulated buildings; thereby saving on the use of fossil fuels for heating and cooling.

This building material composition in an uncured state is made up of between about 70 and 74% by weight water; between about 7 and 8% by weight shredded paper; between about 18 and 20% by weight cement; and, between about 0.1 and 0.4% by weight cement conditioning admixtures.

The building material composition is flopped after mixing to entrain air between about 4 and 5% of the total volume to enhance both the sound deadening qualities as well as the reducing the overall weight and insulative qualities of the building material after curing. After curing of at least 28 days, this building material when formed into 10 inch by 14 inch by 4 inch blocks provides a compressive strength of greater about 3000 psi and a thermal resistance value (R-value) of greater than 3.0 per inch.

The bullet and blast resistant barrier composed of this material can be fashioned by forming a wall of blocks made from the material described herein; and, spraying the wall with a thermoset polyurethane/polyurea polymeric material to provide a resilient surface on said wall of blocks.

DETAILED DESCRIPTION

Figure 1:
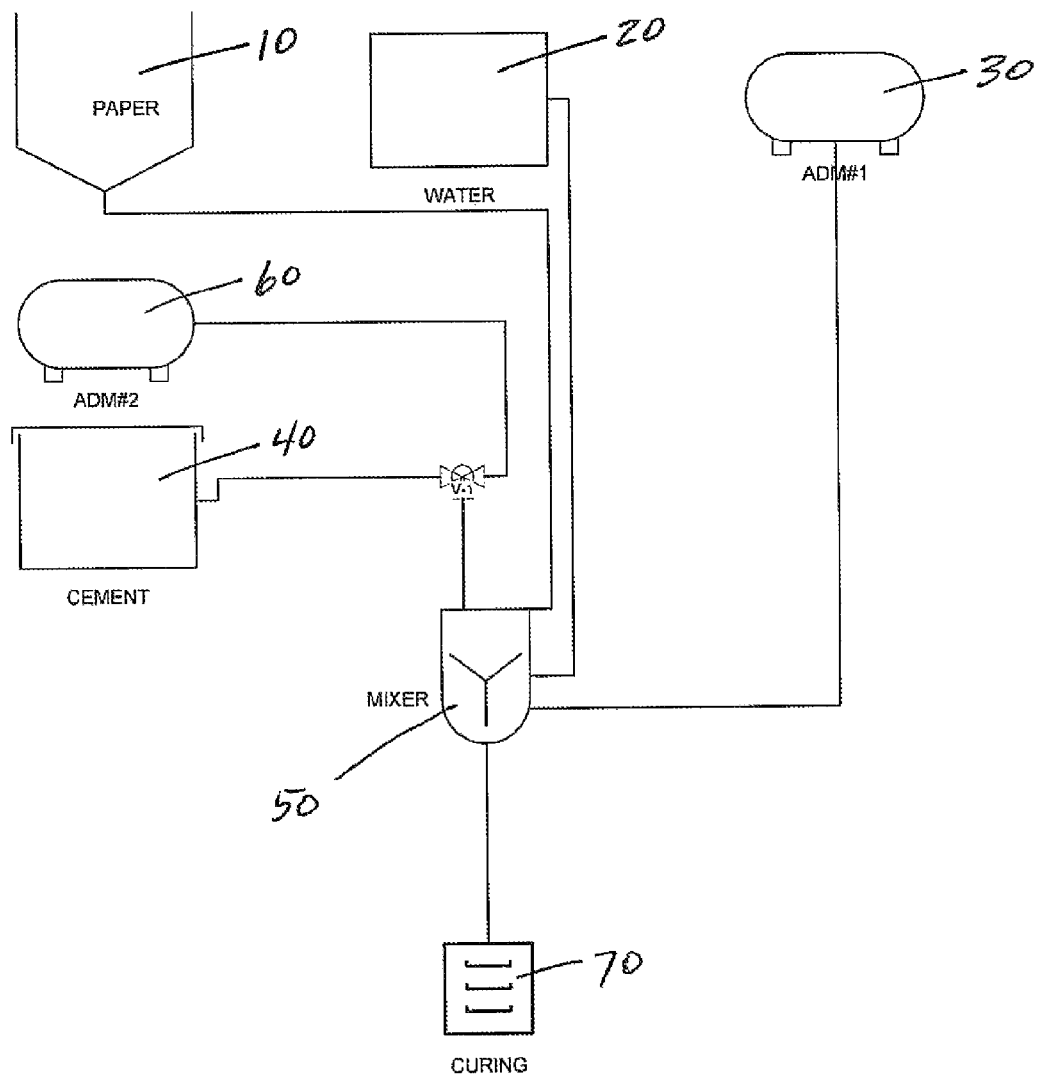
FIG. 1 is a block diagram of the process steps for mixing the building material of the present invention.

FIG. 1 is a schematic diagram of the process of mixing the materials to form the load bearing insulating building materials. Shredded paper 10 is added from a hopper to a mixer 50 along with water and the first admixture 30 comprised of a water dispersing agent, consisting of calcium stearate, trienthanolamine and 4-cloro-3-methylphenol (PCMC) in a water solution and sodium silicate having a pH of about 11, which acts as a fire retardant in the finished product. Lower pH sodium silicate does not perform as well as the higher pH solution for reasons presently unknown to applicants, but is believed to be critical for the successful mixing of the material.

The first admixture in the preferred embodiment is composed of Cleveland, Ohio Euclid Chemical Company's Blocktite water repellant and the sodium silicate. The paper, water and first admixture are mixed for approximately twenty minutes to thoroughly wet the shredded paper which forms the first matrix. The cement 40 is added together with a second admixture 60 and the mixer 50 is maintained at speed to thoroughly incorporate the cement 40 into the first matrix of the wet shredded paper mixture of the first step.

The second admixture 60 is made up of a low chloride air entrainment surfactant, or resin agent consisting essentially of triethanolamine dodecylbenzenesulfonate, a water reducer or superplasticizer consisting of a polyester polyacrylic polyol along with a viscosity modifier consisting of naphthalene sulfonate, welan gum and PCMC in a water solution. The preferred embodiment second admixture is a composition of Euclid Chemical Company's Plastol 5700 superplasticizer, Air 30 air entraining surfactant and Visctrol viscosity modifier. It is believed each of the Euclid Chemicals could be replaced with similar products without undue experimentation to achieve the same superior results without departing from the spirit of this disclosure.

The mixer 50 is then slowed after incorporation of the total amount of cement to allow the entire second matrix to flop in the mixer until the reaction of the cement commences at which time the entire second matrix is poured or extruded into the curing chamber which can be heated and which can consist of molding forms to provide blocks or panels or other useful building materials. Alternatively, the curing chamber can be a extruding press which extrudes the second matrix material to form blocks in an assembly line fashion. The blocks, while still curing, can be cut into uniform lengths and sizes for the completion of the curing process. Alternatively, the material can be poured into molds for ambient air and sun curing.

The use of short paper fibers in a cementitious mix permits the manufacture of insulating building materials having high compressive strength and high R-value. The use of admixtures during the mixing process permits the establishment of substantial quality controls over the mixing process to thereby assure uniform results. These combinations in the correct proportions create a fire-resistant, mold-resistant, vermin-resistant and water resistant building material with a higher insulation rating (R-value) and 60% less weight than comparable products in a similar size. An incorrect mixture and any variation in the sequence of combination prevents the material from achieving its maximum potential.

Cement requires the establishment of a hydraulic bond which cannot be tested in advance of the actual pour, unlike steel girders which can be tested before they are installed. The present insulating building blocks permit the fabrication of structures using these highly insulating materials, formed from recycled paper, thereby saving the environment from the continued destruction of forests to provide the paper, which at the same time creating energy efficient buildings that can be heated and cooled efficiently, thereby saving the increased cost of energy generation to drive the heating and cooling devices.

Concrete used in the building trades is a paste made from Portland cement, water, sometimes entrained air along with sand or gravel aggregate. Concrete suffers from its well known limitations: it has low tensile strength, it is subject to thermal movements, shrinkage, creep under load, and permeability. Cement hardens by a hydration reaction with the formation of a gel and crystals. A gel is a solid network with trapped liquid. Water provides an important ingredient to the setting of concrete and cement should not be allowed to dry during the setting process.

The preferred combination of cementitious materials for the present invention is a 80% Portland cement/20% Type C fly ash; although any type of Portland cement (Type I, I/II, II, III, K or any combination of these) may be used alone. Other cementitious base materials can include, without appropriate modification lime, casein, gypsum, hydraulic cements of all variety (including Portland, gypsum, silicate oxychloride and micro fine cements), along with artificial hydraulic lime cements.

Portland cements are synergistic combinations of various minerals such as tricalcium silicate, $3CaO.SiO_2$ abbreviated $C_3S$ herein; dicalcium silicate, $2CaO.SiO_2$ abbreviated $C_2S$ herein; tricalcium aluminate, $3CaO.Al_2O_3$ abbreviated $C_3A$ herein; and tetracalcium aluminoferrite $4CaO.Al_2O_3.Fe_2O_3$ abbreviated $C_3AF$ herein. $C_3S$ reaches a jellylike state in a few hours generating a substantial heat from the hydration reaction and develops early strength in periods less than 14 days. $C_2S$ provides a slow hydration reaction with correspondingly lower heat generation and develops long-term strength or durability. $C_3A$ hydrates rapidly and generates significant heat providing rapid stiffening but significantly less long-term strength. $C_3AF$ provides little effect on cement performance but is used to decrease the temperature of the cement during mixing and setting. The types of Portland cement are various combinations of these minerals and are well know by those in the art. The fineness of the cement also effects the rate of hydration. Finer cement reacts more quickly because of higher total surface area. Therefore, a Type III Portland cement will usually be finer because its composition tends to provide high early strength. Holding all other conditions equal, all grades of Portland cement should achieve the same level of compressive strength after three months. Accordingly, the present invention permits the use of any Portland cement type with the recognition that the maximum strength resulting from the Portland cement bond will be achievable in three months. In the preferred combination of the present invention, the compressive load strength of the cured mix was 3000 psi. Applicants believe this compressive strength is achievable in as little as 28 days.

Metakaolin can also be used as an adjunct to the cementitious material of the mixture. At about 100-200 degrees C., clay minerals lose most of their adsorbed water. The temperature at which kaolinite loses water by dehydroxilization is in the range of 500-800 degrees C. This thermal activation of a mineral is also referred to as calcining. Beyond the temperature of dehydroxylization, kaolinite retains two-dimensional order in the crystal structure and the product is termed metakaolin. The key in producing metakaolin for use as a supplementary cementing material, or pozzolan is to achieve as near to complete dehydroxilization as possible without over heating. Successful processing results in a disordered, amorphous state, which is highly pozzolanic, and which may then be used to supplement Portland cement or be used on its own as a cementitious element in the present invention.

Air entrainment in the concrete mix improves workability and increases the resistance to damage caused by the freeze-thaw cycle. Although a certain amount of air is entrapped in all concrete mixes, air entrainment is the conscious development of small disconnected but well distributed bubbles by the addition of admixtures such as a resin. The amounts of these resins is usually low (less than 0.1% of the weight of the cement and provide small bubbles, normally 0.001 to 0.003 in. (0.025 to 0.075 mm), constituting 3% to 9% of the concrete mix, and preferably about 4.75% of entrained air by volume of the mix.

The choice of aggregates in cement mixes has always been important because most concrete structures are composed of 60-75% aggregate in the total volume. The present invention uses recycled organic and inorganic materials as the aggregate portion of the cementitious mix. Any recycled cellulose, including short fiber materials such as newsprint, phone books, magazines, lottery tickets, flyers, waste office materials are useable. Also long fiber materials such as cardboard boxes, trays and other packing materials have all been used, but provide an inferior product, it is believed, because of their high water retention thereby requiring substantially more water in the mixing process and slowing the cure rate dramatically. Applicants also believe the short fibers align in more random manner within the matrix thereby increasing the compressive strength of the fully cured product since no long fiber bundles exist which might lead to cracking and rupture of the cementitious bond between the fibers. Rice and cotton hulls remaining from the ginning process, hemp, bamboo, as well as perlite and fiberglass insulation, can all be substituted as aggregate in the cementitious materials; however, it is believed that such long fiber materials increase the amount of water required to completely wet the initial matrix and slow the curing process thereby offering a less advantageous economic alternative to the short fiber cellulose found in newsprint, phone books, lottery tickets and waste office materials. Slick papers such as magazine pages and wax paper are not desirable since the fibers of the materials are bound with other materials which inhibit the bonding with the cementitious material of the mixture.

Treating the wetted fibers with a coating of cement, along with the second admixture, creates a moldable second matrix with maximum strength at minimum cost. Generally, as is well know in this art, strength of concrete is normally higher at lower water to cement ratios, but must be obtain with a compromise in materials to achieve a workable matrix for molding. Additionally, it is well know that concrete structures must achieve high compressive strength. Compressive strength is a function of a time dependent hydration reaction which occurs as moisture is added to the non-hydrated cement. Low water to cement ratios increase the compressive strength of the product significantly. Because air entrainment appears to lower the compressive strength of concrete at a given water to cement ratio, its use may seem problematical. However, air entrainment not only makes concrete more durable, especially under severe freeze-thaw conditions, but it also adds to the workability of the material in the molding stage, as measured by the slump test, which is used by artisans in this field to measure workability of the raw product. Workability must not be so great as to cause segregation or bleeding of the concrete. Bleeding is movement of water to the surface of the sample which suggests higher localized water to cement ratios and lower surface strength and durability of the poured material.

The moisture content of the mixed product is also highly important to the strength achieved by the mix. The reduction or removal of the surface moisture slows down or stops the hydration reaction. The interruption of moist curing of freshly poured concrete after a given period of time by exposure to dry air ultimately stops the curing of the poured material. Accordingly, moist cured building materials can exhibit increased compressive strength over those dried too rapidly.

Finally, temperature is another important factor to be controlled in the production of these building materials. As has been long known in this art field (in fact since Roman times), the hydration reaction in cement releases heat, and the rate of hydration is higher at higher temperatures. Therefore, the correct type of cement paste, the water to cement ratio and the treatment to achieve the optimal strength differ according to the ambient temperature. The provision of ovens with moist heating or steam blanketing is expected to more carefully control the time and temperature required for the production of materials made from the invention of the present application, all in manner well known to those in this art.

The insulating building material is preferably formed using cellulose fibers which result from recycled short fiber shredded paper with a combination of mixed size particles with the largest short fiber shredded paper particle being no bigger than $\frac{1}{4}$ inch$^2$.

The process for making the preferred combination of cement and paper fibers requires the use of existing concrete admixtures at predetermined stages of the mixing process. For example, in mixing sufficient raw materials to obtain 1032 10 in. by 14 in. by 4 in. block (0.54 cubic feet) would require 1,800 gallons (14,994 lbs.) of water to start, 4.5 gallons (52.5 lbs.) of the first admixture, 1,900 lbs of shredded cellulose fibers, 4,800 lbs. of Type I Bulk Portland Cement, to which is added the 3.5 gallons (35.9 lbs.) of the second admixture and an additional 400 gallons (1,666 lbs) of water. The first wetting stage requires mixing no less than twenty minutes at a normal mixer speed of about 16 RPM. After this initial wetting step, the cement and second admixture is added with the additional water to thoroughly mix the cement with the wetted shredded paper. Once all of the cement and water has been added, the mixer speed is decreased to about 10-12 RPM for a period of about fifteen minutes, prior to forming the final building product, such as, without limitation, blocks or slabs, either by pouring into molds or into an extrusion process to form the blocks.

In the molding process, the steel (rubber or plastic can also be used) molds are sprayed with a soy based oil to prevent sticking to the form and the second matrix is poured into the form where any excess is swiped off the top of the mold. The curing process has by this step already commenced and the blocks are left in the molds for approximately forty minutes to complete set up, after which the steel, rubber, or plastic molds are lifted and the blocks are left to continue curing. After about twelve hours, the blocks may be palletized to continue the twenty-eight day curing process before use in the construction industry. It is believed that plastic conveyor driven molds could be alternatively used thereby allowing the poured blocks to be moved through a curing stage with a steam or wet blanket to complete the initial setup of the blocks before removed from the conveyor molds in a automatic stacking process. In either event, the partially cured blocks made from the second matrix material of the present invention will be left to complete curing during the twenty-eight day period.

The fabrication process can also allow for colorizing of the material and the formation of the material into any number of desirable shapes or sizes for most building applications. Slabs of the material can be formed for tilt-up construction, for bullet or blast mitigation, or for acoustical barriers. Vaults, cellars, partition walls, balusters, arches, columns or other architecturally desired pieces may be formed from the raw building material prior to its curing.

Bullet and blast resistant walls can be formed from the material by constructing the wall in a normal manner, then covering the wall with a thermoset polyurethane/polyurea coating of about ⅛ inch to ¼ inch thick should provide an Underwriter's Laboratory UL 752 rating greater than Level 8 (the highest rating made). This thermoset polymeric coating may be obtained from Line-X Corp. of Santa Ana, Calif., and has been previously used for spray-on pickup truck bed liners. Because of the resilience of both the coating and of the insulating material described herein, the panels made from this combination would be virtually impenetrable by blast or bullet fragments and such panels could be used in combat housing and command and control centers to protect the occupants from nearby bombs detonation and bullet entry.

Numerous other embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What we claim is:

1. An insulating building material prepared by a process comprising the steps of:
    mixing shredded recycled short fiber paper derived from a group consisting of newsprint, phone books, waste office paper and lottery tickets with water and sodium silicate, to form a first matrix;
    adding cement and a water-reducing superplasticizer to the first matrix;
    accelerating the mixing of the first matrix;
    adding additional water with an air-entraining polymer and a viscosity modifier forming a thickened second matrix;
    adding additional water to the thickened second matrix;
    mixing the second matrix to entrain air within the second matrix;
    forming a building product from such thickened second matrix; and,
    allowing said building product to cure.

2. The insulating building material of claim 1 wherein the forming comprises placing the thickened second matrix in a drying mold to form an insulating building material.

3. The insulating building material of claim 1 wherein the forming comprises extruding the thickened second matrix and cutting the extruded material into blocks.

4. The insulating building material of claim 1 wherein the superplasticizer is water, a polyester polyacrylic polyol, and calcium stearate, triethanolamine and 4-cloro-3-methylphenol and sodium silicate.

5. The insulating building material of claim 1 wherein the air-entraining polymer and a viscosity modifier is water, triethanolamine, dodecylbenzenesulfonate, naphthalene sulfonate, welan gum, and 4-cloro-3-methylphenol.

6. The insulating building material of claim 1 wherein the cement is a hydraulic cement selected from a group consisting of Portland cement, cement and fly ash, lime, casein, gypsum, slag cement, calcium aluminate cement, phosphate cement, high alumina cement, or metakaolin, or some combination of these materials.

7. The insulating building material of claim 1 wherein the cement is a combination of Portland cement and Type C fly ash.

8. The insulating building material of claim 7 wherein the Portland cement is about 80% by weight and the fly ash is Type C and about 20% by weight of the cement.

9. The insulating building material of claim 1 wherein the cellulose fibers are a mixture of short fiber shredded paper providing a combination of mixed size particles.

10. The insulating building material of claim 9 wherein the largest short fiber shredded paper particles is smaller than ¼ inch$^2$.

11. The insulating building material of claim 1 wherein the material is coated with a polyurethane/polyurea elastomeric material to form a blast and bullet resistant building material.

12. The insulating building material of claim 1 wherein, in the uncured state, the composition is made up of between about 70-74% by weight water, about 7-8% by weight shredded recycled short fiber paper, about 18-20% by weight cement and about 0.1-0.4% by weight cementing conditioning superplasticizer, air-entraining polymers and viscosity modifiers.

13. The insulating building material of claim 1 wherein the mixing of the second matrix results in a composition of about 4-5% by total volume of entrained air.

14. The insulating building material of claim 1 wherein the mixing of the first matrix is performed for at least twenty minutes at a speed of about 16 revolutions per minute.

15. The insulating building material of claim 1 wherein the mixing of the second matrix is performed at a speed of about 10-12 revolutions per minute for fifteen minutes.

* * * * *